United States Patent [19]

Emura et al.

[11] Patent Number: 4,741,489

[45] Date of Patent: May 3, 1988

[54] DRAG MECHANISM IN DOUBLE-BEARING REEL

[75] Inventors: Masaharu Emura; Takehiro Kobayashi, both of Hiroshima, Japan

[73] Assignee: Ryobi Ltd., Hiroshima, Japan

[21] Appl. No.: 33,188

[22] Filed: Apr. 2, 1987

[30] Foreign Application Priority Data

Apr. 3, 1986 [JP] Japan ............................. 61-50397[U]

[51] Int. Cl.[4] ...................... A01K 89/04; A01K 89/02
[52] U.S. Cl. ............................ 242/84.1 R; 242/84.42; 242/211
[58] Field of Search ............. 242/84.1 R, 84.4, 84.41, 242/84.42, 211–214, 216–220, 84 J

[56] References Cited

U.S. PATENT DOCUMENTS 3,104,850  9/1963  Wood ................................. 242/212
3,612,437  10/1971  Allebach ........................... 242/220
4,572,455  2/1986  Noda ............................. 242/84.1 R

FOREIGN PATENT DOCUMENTS 60-12925 of 1985 Japan .

Primary Examiner—Donald Watkins
Attorney, Agent, or Firm—Finnegan, Henderson, Farabow, Garrett & Dunner

[57] ABSTRACT

A double-bearing reel with a level wind mechanism wherein a drag mechanism is so designed that the traverse cam shaft of the level wind mechanism supports the master gear of a drive mechanism and drag brake and has both ends confronted with openings formed in the side covers of the reel, and rotatably supported by the side frames of the reel, and that a handle shaft connected to the handle of the reel is detachably inserted into the traverse cam shaft from either end in such a manner that it is non-rotatable with respect to the traverse cam shaft, and a drag control ring and a drag handle are mounted on the handle shaft and engaged with each other in such a manner that they are movable relative to each other, whereby the drag brake can be tightened by turning the drag handle in the forward direction of rotation of the handle not only when the reel is operated with the handle on the right but also when the reel is operated with the handle on the left.

6 Claims, 5 Drawing Sheets

DRAG MECHANISM IN DOUBLE-BEARING REEL

BACKGROUND OF THE INVENTION

This invention relates to a star drag handle type double-bearing reel with a level wind mechanism for uniformly winding a fishing line on the spool, and particularly such a reel in which the handle can be set on the left as well as on the right.

A conventional double-bearing reel of this type has been disclosed by Japanese Patent Application (OPI) No. 12925/1985 (the term "OPI" as used herein meaning "an unexamined published application"). However, the conventional double-bearing reel is disadvantageous in that the drag tightening direction (i.e., the drag force increasing direction) when the reel is operated with the handle on the right of the reel is opposite to that when the reel is operated with the handle on the left. For instance, the handle is turned in one direction to increase the drag in the former case, whereas the handle must be turned in the reverse direction in the latter case. Therefore, the conventional double-bearing reel is not satisfactory in operability. Furthermore, in the conventional double-bearing reel, the supporting cylinder shaft, the interlocking cylinder shaft, and the handle shaft form a triple layer structure. Thus, the composite shaft mechanism is intricate, which causes various problems in practical use, in manufacture, and in cost.

SUMMARY OF THE INVENTION

Accordingly, an object of this invention is to overcome the above-described difficulties accompanying a conventional star drag handle type double-bearing reel with a level wind mechanism in which the handle can be set on either the left or right side of the reel.

More specifically, an object of the present invention is to provide a drag mechanism for a double-bearing reel in which the handle can be set on the left of the reel as well as on the right, which permits rotation of the drag handle in the forward direction to increase the drag force, regardless of whether the reel is operated with the handle on the right, or with the handle on the left.

A further object of the present invention is a drag mechanism for a double-bearing reel which is simple in construction, and in which the handle can be set on the right or on the left.

The foregoing objects and other objects of the invention are achieved by the present invention which provides a double-bearing reel comprising a pair of spaced apart side frame members, each including a side cover member with an opening therin. A spool member is rotatably supported by the side frame members and a drive mechanism is operatively connected to the spool member and includes a master gear. A drag means is operatively connected to the spool member. A handle member is operatively connected to the drive mechanism and the drag means for applying torque to the spool member. A level wind mechanism is operatively connected to the handle member and the spool member for uniformly winding a fishing line on said spool member and including a traverse cam shaft which supports the master gear of the drive mechanism and the drag means, and has each of its ends aligned with one of the openings in the side covers, and is rotatably supported by the side frames. A handle shaft having a base end and a top end is connected at the base end thereof to the handle member and has a retaining member at the top end thereof. The handle shaft is detachably inserted into the traverse cam shaft in such a manner that the handle shaft is non-rotatable with respect to the traverse cam shaft, but is slidable therein. The handle shaft is insertable into the traverse cam shaft from either end. A drag control ring is mounted on the handle shaft and is slidable thereon in the axial direction. A drag handle is threadably engaged with the drag control ring and movable relative to the drag control ring in the axial direction so that the drag means is tightened when the drag handle is turned in the forward direction of rotation of the handle member. The drag handle, drag means, master gear and traverse cam shaft are held, in the axial direction, between the handle member and the retaining member.

BRIEF DESCRIPTION OF THE DRAWINGS

The nature, principle and utility of the present invention will become fully apparent from the following detailed description when read in conjunction with the accompanying drawings in which like parts are designated by like reference numerals or characters.

DETAILED DESCRIPTION OF THE INVENTION

Figure 1:
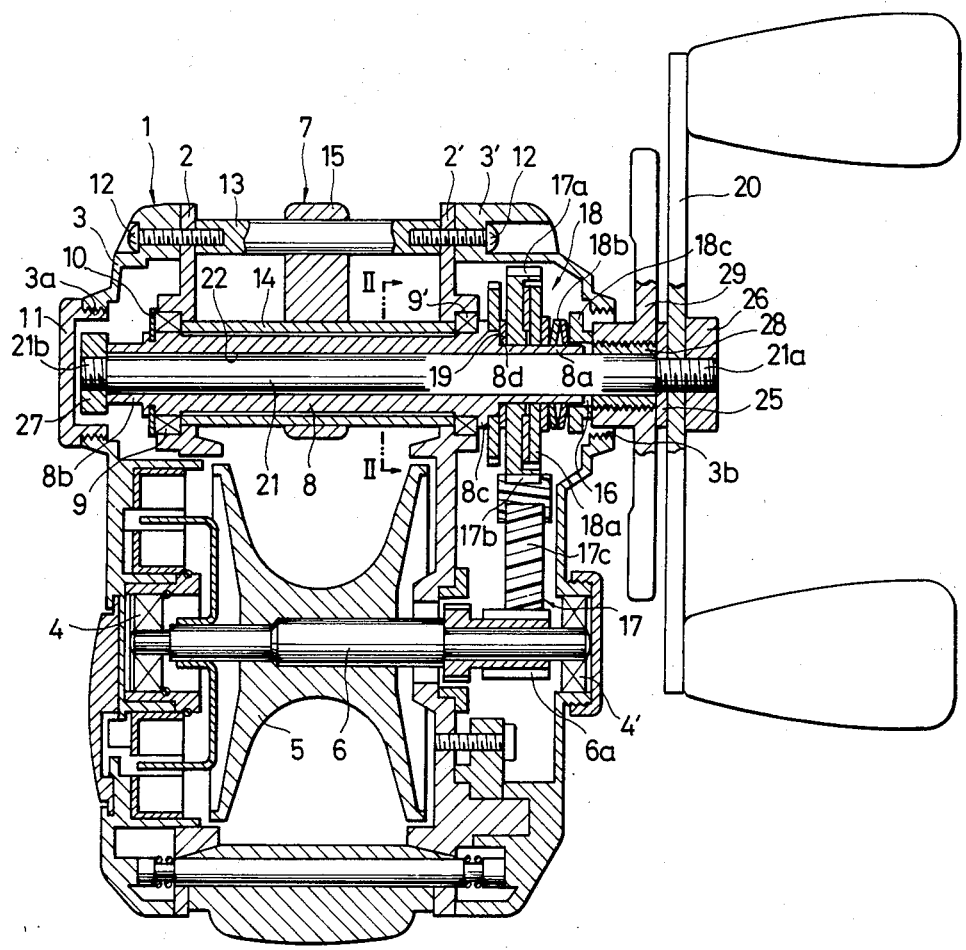
FIG. 1 is a sectional view showing a double-bearing reel according to the present invention which is operated with the handle on the right.

A first example of a drag mechanism for a double-bearing reel according to this invention is as shown in FIGS. 1 through 4.

As is apparent from these figures, a reel body 1 is made up of a pair of side frames 2 and 2' spaced from each other, and side covers 3 and 3' are secured to respective side frames 2 and 2' with screws. A spool 5 mounted on a spool shaft 6 is rotatably supported by the side covers 3 and 3', respectively, through bearings 4 and 4'.

A level wind mechanism 7 has a traverse cam shaft 8, which is rotatably supported by the side frames 2 and 2', respectively, through bearings 9 and 9' in such a a manner that the shaft 8 is in parallel with the spool shaft 6.

A flange 8c formed at one end portion 8a of the traverse cam shaft 8, and a retaining ring 10 engaged in a groove formed in the other end portion 8b are abutted against the outer surfaces of the bearings 9' and 9, respectively, to prevent the movement of the traverse cam shaft 8 in the axial direction. One end portion 8a and the other end portion 8b of the traverse cam shaft 8 are opposite to, and held in alignment with, the openings 3a and 3b formed in the side covers 3 and 3', respectively, so that the handle can be set either on the right or on the left. The openings 3a and 3b are threaded-holes equal in diameter. One of the openings 3a and 3b is covered with a common threaded cover 11.

In the level wind mechanism 7, a line guide holder 15 is mounted on a guide rod 13 which is held between the side frames 2 and 2' with screws 12 so that the guide rod 13 is parallel to the traverse cam shaft 8. Line guide holder 15 is also mounted on a protective cylinder 14 fitted on the traverse cam shaft 8 so that the line guide holder is slidable in the axial direction and is slidably engaged with a traverse cam groove cut in the cylindrical surface of the traverse cam shaft 8. Therefore, as the traverse cam shaft is rotated, the line guide holder 15 is reciprocated horizontally.

Both the end portion 8a and the other end portion 8b of the traverse cam shaft 8 are smaller in diameter than the middle portion. A master gear 17a of a drive mechanism 17, together with a washer 19, is mounted on the one end portion 8a of the traverse cam shaft 8 in such a manner that the master gear 17a is rotatable and slidable in the axial direction. The washer 19 is held between the master gear 17a and an annular step 8d formed between the one end portion 8a and the middle portion of the traverse cam shaft 8. The end portion 8a is deformed, for instance, with a substantially elliptical section, and a drag means 18 and a drag collar 18c are mounted on the end portion 8a thus deformed in such a manner that they are non-rotatable, but slidable in the axial direction.

The drive mechanism 17 comprises the aforementioned master gear 17a; and idle gear 17b engaged with the master gear 17a; and an idle gear 17c engaged with a pinion 6a of the spool shaft 6. The drag means 18, or drag brake, comprises a slide plate 18a; and drag washers and spring members 18b. When the drag collar 18c is pushed to the left in FIG. 1, the drag means 18 is tightened, thus increasing the braking or drag force.

The traverse cam shaft 8 is a hollow shaft. As handle shaft 21 is detachably inserted into the axial hollow 22 of the traverse cam shaft 8 through either of the openings 3a or 3b, as desired, of the reel body 1 and a handle 20 is provided on the right side or on the left side of the reel body 1, as desired, so that the handle shaft 21 is slidable in the axial direction, but non-rotatable in the axial hollow 22, so that the handle shaft 21 is rotated together with the traverse cam shaft 8.

Figure 2:
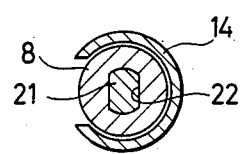
FIG. 2 is a sectional view taken along line II—II in FIG. 1, showing one example of means for preventing the rotation of a handle shaft with respect to a traverse cam shaft in the drag mechanism shown in FIG. 1.
Figure 3:
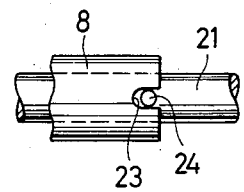
FIG. 3 is a plan view showing another example of the means shown in FIG. 2.

The rotation of the handle shaft with respect to the traverse cam shaft 8 is prevented as follows: The hollow 22 of the traverse cam shaft 8 and the handle shaft 21 are irregular, e.g., made polygonal, in section, or substantially ellipitical as shown in FIG. 2. Alternatively, as shown in FIG. 3, an engaging groove 23 is formed in the traverse cam shaft 8 at one end, and a pin 24 is embedded in the handle shaft 21 to extend perpendicular to the axis. The pin 24 is engaged with the groove 23 so that the handle shaft and the traverse cam shaft are turned as one unit. Other conventional methods may be employed to prevent the rotation of the handle shaft with respect to the traverse cam shaft.

The handle shaft 21 is longer by a predetermined amount than the traverse cam shaft 8. The base end portion and the top end portion of the handle shaft 21 are formed into threaded parts 21a and 21b, respectively, which are smaller in diameter than the remaining portion. The handle 20, together with a washer 25, is mounted on the threaded part 21a and secured to the handle shaft 21 with a nut 26. A retaining member 27 such as a nut is engaged with the other threaded part 21b of the handle shaft 21.

A drag control ring 28, whose cylindrical outer surface is threaded, is mounted on the handle shaft 21 at the base end in such a manner that a suitable gap 16 is provided between the ring 28 and the traverse cam shaft 8, and the drag control ring 28 is non-rotatable with respect to the handle shaft 21, but slidable in the axial direction. The thread cut in the cylindrical outer surface of the drag control ring 28 is right-handed, so that a drag handle 29 is threadably engaged with the drag control ring 28 in such a manner that it is movable with respect to the drag control ring 28 in the axial direction. Thus, the drag handle 29, the drag collar 18c, the drag means 18, the master gear 17a and the traverse cam shaft 8 are held between the retaining member 27 at the end of the handle shaft and the handle 20 so that these components form a so-called "sandwich structure."

When, in the case where the reel is operated with the handle on the right, the drag handle 29 is turned in the reverse direction to loosen the drag means 18 (as described later), the drag control ring 28 is moved to the left in FIG. 1. For the purpose of preventing the drag means 18 from being tightened in this operation, the inside diameter of the drag collar 18c is made slightly larger than the outside diameter of the drag control ring 28. On the other hand, the outside diameter of the other end portion 8b of the traverse cam shaft 8 is made smaller than the inside diameter of the drag handle 29 so that the drag means 18 may not be tightened when, in the case where the reel is operated with the handle on the left, the drag handle 29 is turned in the reverse direction to loosen the drag means.

In FIG. 1, the handle 20 is provided on the right side of the reel body 1. When the drag handle 29 of the reel as shown in FIG. 1 is turned in the forward direction of rotation of the handle 20, the drag handle 29 is moved to the left FIG. 1. As a result, because of the aforementioned "sandwich structure," the drag control ring 28 and the drag handle 29 are moved in opposite directions, so that the drag collar 18c is pushed to the left in FIG. 1 by the drag handle 29. As a result, the drag means 18 and the master gear 17c are tightened between the drag collar 18c and the step 8d of the traverse cam shaft 8, so that the drag force is increased.

When, in contrast, the drag handle 29 is turned in the reverse direction of rotation of the handle 20, the drag means 18 is loosened as shown in FIG. 1, and the drag force is decreased. However, if the drag handle 29 is further turned in the same direction, then the drag control ring 28 is moved to the left in FIG. 1; however, since the outside diameter of the drag control ring 28 is smaller than the inside diameter of the drag collar 18c, the drag collar 18c is not pushed by the drag control ring 28, and therefore the drag means 18 is further loosened.

Figure 4:
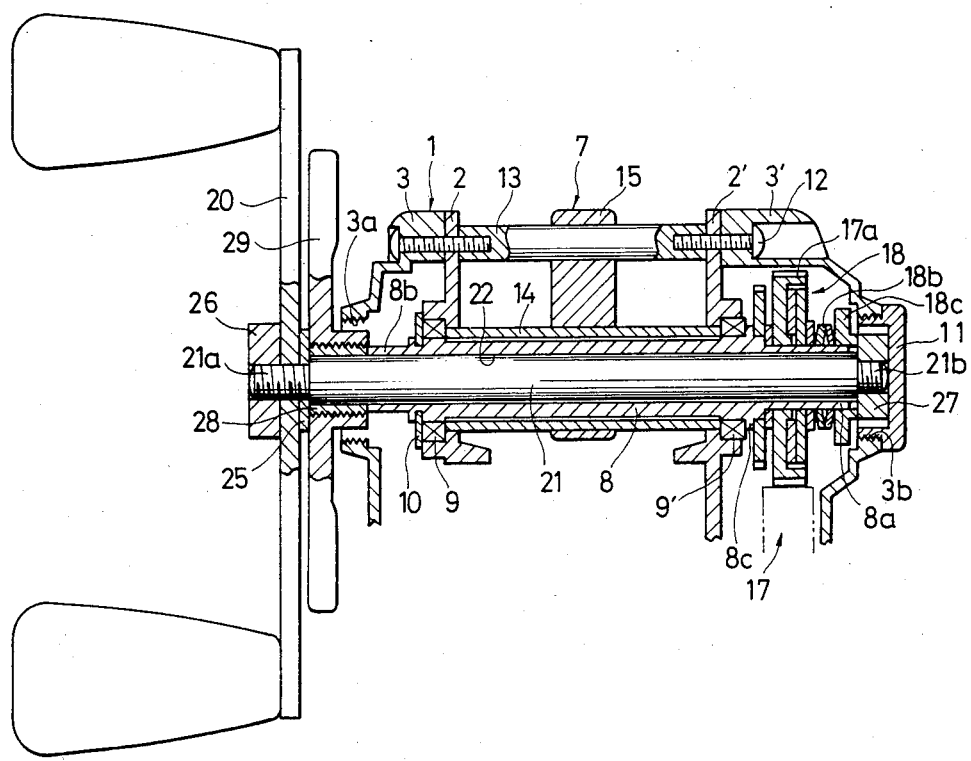
FIG. 4 is a sectional view showing the drag mechanism in the double-bearing reel according to the present invention which has been converted for operation with the handle on the left according to the invention.

FIG. 4 shows the reel with the handle on the left. The double-bearing reel which is operated with the handle 20 on the right can be converted in to one which is operated with the handle on the left, or vice versa, by the following method: First, the threaded cover 11 is removed from the left side cover, and then the retaining member 27 is removed from the handle shaft 21. The handle shaft 21 together with the handle 20, the drag control ring 28 and the drag handle 29 is pulled, to the right in FIG. 1, out of the traverse cam shaft 8. Thereafter, the handle shaft 21 is inserted into the traverse cam 8 from the left side of the reel body, and then the retaining member 27 is screwed on the end portion of the handle shaft 21 thus inserted. Thus, the reel with the handle 20 on the left as shown in FIG. 4 has been obtained. Then, the right opening 3b is covered with the threaded cover 11 which has been removed from the left opening 3a.

In the above-described conversion of the reel, the drag means 18 and the drag collar 18c can be prevented from coming off the traverse cam shaft 8 by the following arrangement. The outside diameter of the drag collar 18c may be made larger than the diameter of the openings 3a and 3b, or the drag collar 18c may be provided with the flange whose outside diameter is larger than the diameter of the openings 3a and 3b.

If the drag handle 29 is turned in the forward direction of rotation of the handle 20 when the handle 20 is mounted on the left as shown in FIG. 4, the drag control ring 28 will be moved to the right. As a result, the drag control ring 28 and the drag handle 29 are moved relative to each other in the axial direction so that the drag collar 18c is pushed through the retaining member 27 to the left in FIG. 4, and therefore the drag means 18 is tightened, thus increasing the drag force.

On the other hand, when the drag handle 29 is turned in the reverse direction of rotation of the handle 20, similarly as in the case of the right-handle-operated reel described above, the drag means 18 is loosened as shown in FIG. 4. If the drag handle 29 is further turned in the same direction, the drag handle 29 will be moved to the right in FIG. 4. In this operation, since the inside diameter of the drag handle 29 is larger than the outside diameter of the end portion 8b of the traverse cam shaft 8, the drag handle 29 covers the end portion 8b, but does not push the traverse cam shaft 8. Therefore, the drag means 18 is not loosened, and the drag force is not changed.

Figure 5:
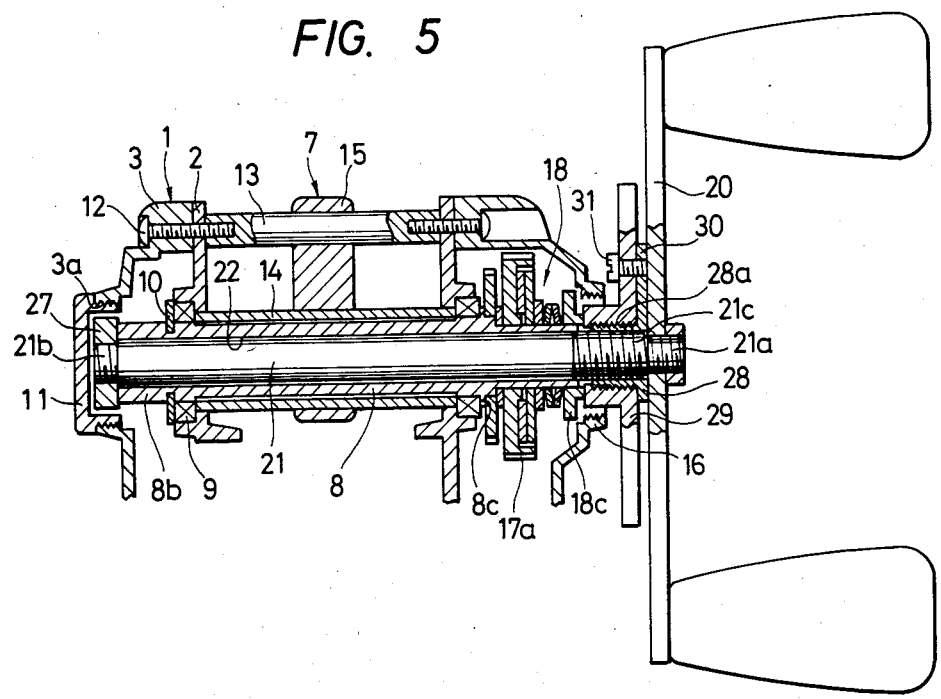
FIG. 5 is a sectional view showing a second example of the drag mechanism in the double-bearing reel according to the present invention with the handle on the right.
Figure 6:
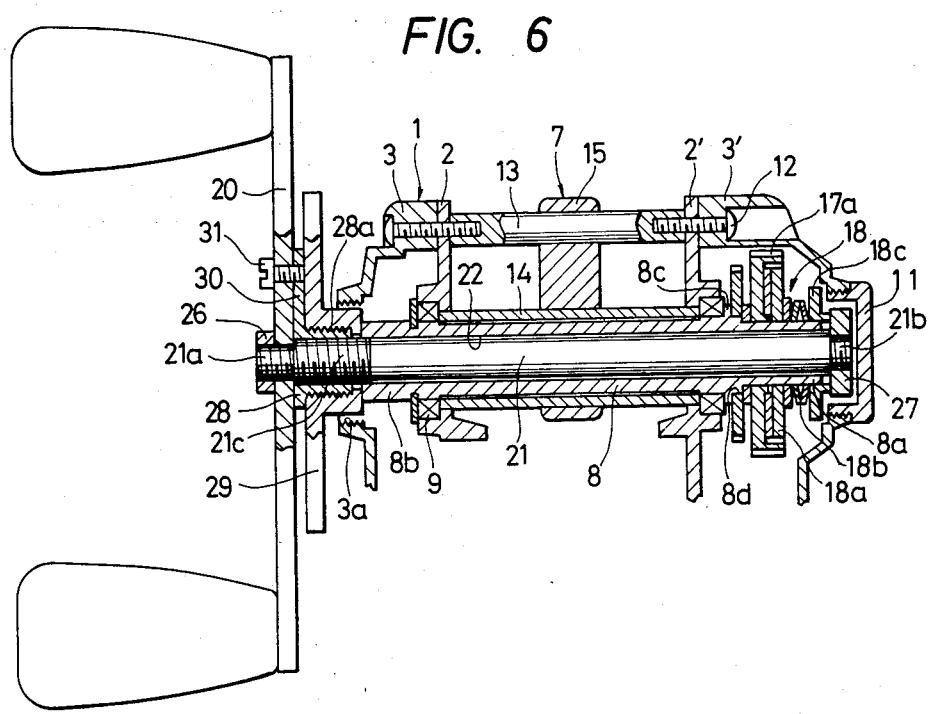
FIG. 6 is a sectional view showing the second example of the drag mechanism in the double-bearing reel according to the present invention with the handle on the left.

A second example of the drag mechanism according to the present invention is shown in FIGS. 5 and 6. In the drag mechanism, a right-handed thread 21c is cut in the cylindrical surface of the base end portion of a handle shaft, which is inserted into the traverse cam shaft 8 in such a manner that the handle shaft 21 is rotatable together with the rotation of the transverse cam shaft 8, and is slidable with respect thereto. A drag control ring 28 is screwed on the threaded part 21c so that it is movable in the axial direction. A left-handed thread 28a is cut in the cylindrical outer surface of the drag control ring 28. The drag handle 29 is screwed on the drag control ring 28.

When the handle 20 is mounted on the right as shown in FIG. 5, the drag handle 29 may be turned in the forward direction of rotation of the handle 20 which will cause it to move to the left in FIG. 5 and to tighten the drag means 18. For this purpose, the rotation of the drag control ring 28 and the drag handle 29 is prevented with a stopper 30 and a stopping screw 31 so that the right-handed threaded part 21c of the handle shaft 21 is used.

On the other hand, in the handle 20 is mounted on the left, as shown in FIG. 6, the drag handle 29 may be turned in the forward direction of rotation of the handle 20 to tighten the drag means 18. The rotation of the drag control ring 28 and the handle 20 is prevented with the stopper 30 and the stopping screw 31 so that the left-handed threaded part 28a of the drag control ring is used.

The remaining elements of the second example of the drag mechanism is the same as that of the first example described above.

Figure 7:
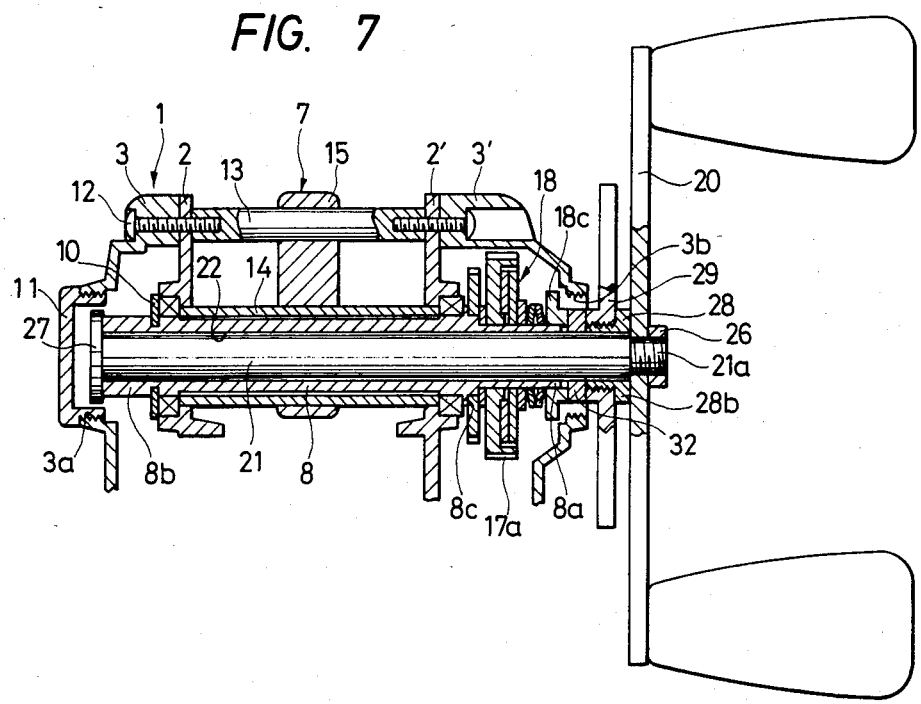
FIG. 7 is a sectional showing a third example of the drag mechanism in the double-bearing reel according to the present invention with the handle on the right.
Figure 8:
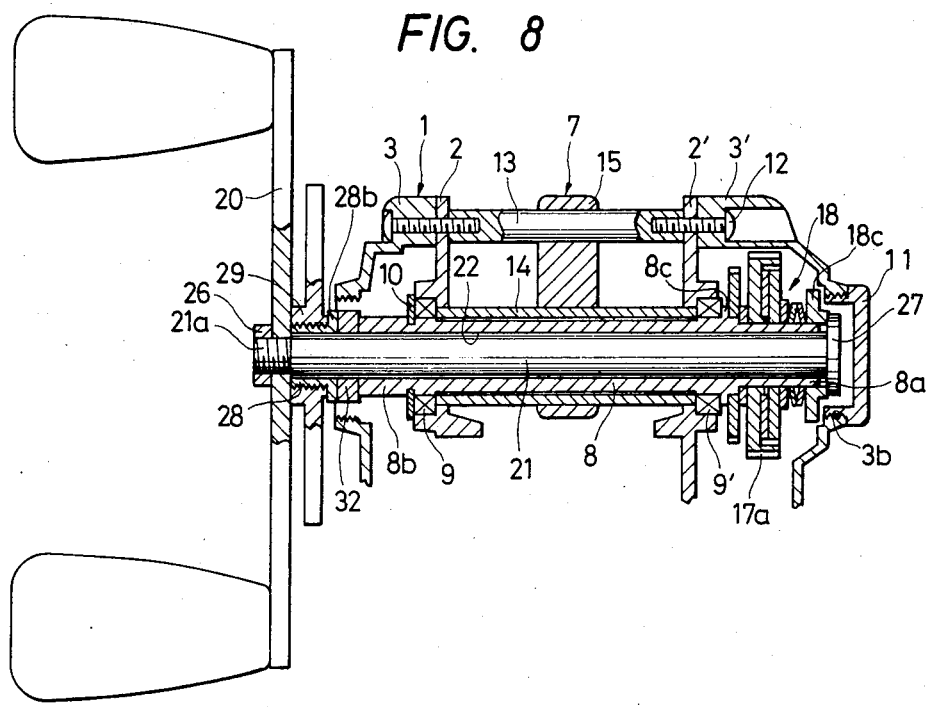
FIG. 8 is a sectional view showing the third example of the drag mechanism in the double-bearing reel according to the present invention with the handle on the left.

FIGS. 7 and 8 show a third example of the drag mechanism according to the present invention.

As in the first example of the drag mechanism shown in FIG. 1, a drag control ring 28 and a drag handle 29 are mounted on a handle shaft 21 at the base end. The drag control ring 28 has a stopping flange 28b at one end. A collar 32 is mounted on the handle shaft 21 at its base end in such a manner that it is located between the drag control ring 28 and the traverse cam shaft 8. A retaining member 27 like a flange is secured to the end of the handle shaft 21.

In the case when the handle is mounted on the right as shown in FIG. 7, the drag control ring 28 is mounted on the handle shaft 21 with its flange 28b on the handle 20. The reel can be converted into a reel with the handle mounted on the left by the following method: First, the handle 20 is removed from the handle shaft 21, and then the drag control ring 28, the drag handle 29 and the collar 32 are removed therefrom. Thereafter, the threaded cover 11 is disconnected from the opening 3a. The handle shaft 21 is removed from the traverse cam shaft 8 by being pulled to the left in FIG. 7. The handle shaft 21 thus removed is inserted into the traverse cam shaft 8 through the right opening 3b, and the collar 32, the drag control ring rignt 28 and the drag handle 29 are mounted on the handle shaft 21 in the stated order. Then, the handle 20 is secured to the handle shaft 21, so that the retaining member 27 is abutted against the drag collar 18c. This completes the conversion.

In the conversion, the drag control ring 28 is mounted on the handle shaft 21 with its collar 28b held on the right side as when the reel is mounted on the right. Therefore, when the drag handle 29 is turned in the reverse direction of rotation of the handle 20, the collar 28b serves as a member for stopping the drag handle.

As is apparent from the above description of the present invention, when it is desired to install the handle 20 on the right side or on the left side of the reel body, the drag handle 29 together with the handle shaft 21 can be readily installed on the right side or on the left right. Furthermore, according to the invention, in both instances the drag handle 29 is turned in the forward direction of rotation of the handle 20 to tighten the drag means and to increase the drag force. Thus, the reel with the drag mechanism of the present invention is excellent in operability.

What is claimed:
1. A reel comprising:
(a) a pair of spaced apart side frame members, each including a side cover member with an opening therein;
(b) a spool member rotatably supported by said side frame members;
(c) a drive mechanism operatively connected to said spool member and including a master gear;

(d) drag means operatively connected to said spool member;

(e) a handle member operatively connected to said drive mechanism for applying torque to said spool member;

(f) a level wind mechanism operatively connected to said handle member and said spool member for uniformly winding a fishing line on said spool member and including a traverse cam shaft, said traverse cam shaft supporting said master gear and said drag means, having each end thereof aligned with one of said openings in said side covers, and being rotatably supported by said side frames;

(g) a handle shaft having a base end and a top end, said handle shaft being connected at said base end to said handle member and having a retaining member at said top end, and being detachably inserted into said traverse cam shaft, rotatable therewith, and slidable thereon, said handle shaft being insertable into said traverse cam shaft from either end;

(h) a drag control ring non-rotatably mounted on the base end of said handle shaft and slidable thereon in the axial direction; and (i) a drag handle threadably engaged with said drag control ring and moveable with respect thereto in the axial direction so as to tighten said drag means when said drag handle is turned in the forward direction of rotation of said handle member, said drag handle, drag means, master gear and traverse cam shaft being held, in the axial direction, between said handle member and said retaining member.

2. The reel of claim 1, wherein there is provided an axial hollow in said traverse cam shaft and said axial hollow and said handle shaft each have an irregular cross-section.

3. The reel of claim 1, wherein said traverse cam shaft has an engaging groove therein and said handle shaft has a pin member adapted to engage said groove.

4. The reel of claim 1, wherein said drag means comprises a slide plate, drag washers, and spring members and said reel further includes a drag collar positioned between said drag means and said drag handle.

5. The reel of claim 1 wherein the surface of the base end of said handle shaft is threaded, said drag control ring is screwed on said base end, the cylindrical outer surface of said drag control ring is threaded in a direction opposite to the threads on said base end, and said drag handle is screwed onto said drag control ring.

6. The reel of claim 1, wherein said drag control ring has a stopping flange at one end thereof adjacent said handle member, and a collar is mounted on said handle shaft between said drag control ring and said traverse cam shaft.

* * * * *